United States Patent
Bell et al.

(10) Patent No.: US 6,223,896 B1
(45) Date of Patent: May 1, 2001

(54) CARRYING CASE WITH FLEXIBLE SHIELD FOR LAPTOP COMPUTER

(75) Inventors: William C. Bell; Mayumi Hayashi, both of Akron, OH (US); Masami Iizumi, Wauconda, IL (US)

(73) Assignee: Flex Shield Inventors Trust, Akron, OH (US)

( * ) Notice: Subject to any disclaimer, the term of this patent is extended or adjusted under 35 U.S.C. 154(b) by 0 days.

(21) Appl. No.: 09/388,516

(22) Filed: Sep. 2, 1999

(51) Int. Cl.⁷ .............................. B65D 85/00; H05K 9/00; G06F 1/16
(52) U.S. Cl. .................. 206/320; 174/35 R; 361/683; 361/800; 361/816
(58) Field of Search ........................ 206/320, 523, 206/576; 174/35 R, 35 RMS; 361/800, 816, 818, 683, 686, 687

(56) References Cited

U.S. PATENT DOCUMENTS

| | | | | |
|---|---|---|---|---|
| 3,909,504 | * | 9/1975 | Browne | 361/800 X |
| 5,002,184 | * | 3/1991 | Lloyd | 206/523 X |
| 5,010,988 | | 4/1991 | Brown . | |
| 5,139,838 | | 8/1992 | Baum . | |
| 5,217,119 | | 6/1993 | Hollingsworth . | |
| 5,274,846 | | 1/1994 | Kolsky . | |
| 5,484,063 | * | 1/1996 | Cuccio et al. | 206/320 X |
| 5,524,754 | | 6/1996 | Hollingsworth . | |
| 5,666,265 | * | 9/1997 | Lutz et al. | 361/683 |
| 5,713,465 | | 2/1998 | Choe . | |
| 5,762,250 | * | 6/1998 | Carlton et al. | 206/320 X |
| 5,889,230 | * | 3/1999 | Katz | 174/35 R |
| 5,938,096 | * | 8/1999 | Sauer et al. | 206/320 X |
| 5,953,206 | * | 9/1999 | Jondrow | 361/687 |
| 5,960,952 | * | 10/1999 | Chen | 206/320 |
| 6,026,961 | * | 2/2000 | McCarthy et al. | 206/576 |

FOREIGN PATENT DOCUMENTS 2233926    1/1991   (GB) .

* cited by examiner

Primary Examiner—Bryon P. Gehman
(74) Attorney, Agent, or Firm—Emerson & Skeriotis; Roger D. Emerson; Daniel A. Thomson

(57) ABSTRACT

An inventive flexible shield and carrying case for laptop computers and other delicate devices are described herein. The flexible shield is preferably made of polyethylene that increases in width from the front of the case to the zipper, and from the back of the case to the zipper. The flexible shield dissipates the force of a blow to the outside of the case and away from the computer. A method is also included for recharging the computer without opening the case, including the steps of providing an adapter, an adapter cord, an adapter port, and a cord retractor, pulling the cord through the adapter port, plugging the cord into a power source, recharging the associated equipment, unplugging the cord from the power source, and retracting the cord.

20 Claims, 15 Drawing Sheets

CARRYING CASE WITH FLEXIBLE SHIELD FOR LAPTOP COMPUTER

BACKGROUND OF THE INVENTION

I. Field of the Invention

This invention is directed to electronic device carriers, specifically to improve weight reduction and shielding while maximizing the volume inside of the case and the case's functionality by providing cases with and without built in adapters.

II. Description of the Related Art

"Laptop" and "notebook" computers, that is, personal computers so reduced in size and weight as to be conveniently carried and employed while traveling, have enjoyed widespread acceptance of late. Unfortunately, it is difficult to make notebook computers compact while at the same time making them rugged enough to withstand being dropped or otherwise subjected to shock. The small size of today's laptop computers leaves little or no room inside for shock absorbing materials to protect the vulnerable parts of the computer, such as the LCD screen, the bard drive, the plastic outer case, and the various connectors.

The effect of being dropped or hit is measured in G's, which represents an acceleration of 32 feet/sec$^2$. Each computer manufacturer's design is different, so there is no universally safe level of shock for laptop computers and circuits. However, the manufacturers of hard drives typically specify that their drives can withstand shocks in the range of 75-to-200 G. The manufacturers of LCD screens, on the other hand, guarantee their screens to withstand shocks of only about 50 G's, a level which can be reached by dropping a laptop computer from a height of only six inches. Most manufacturers of carrying cases for notebook computers incorporate into their cases foam padding ranging in thickness from about one-half to about three inches. Foam padding will protect the computer until completely compressed, which is typically half of the thickness of the foam pad. Tests have shown that carrying cases having only two inches of foam padding need only receive a shock that is the equivalent to an eight inch fall to exceed the 50 G threshold for LCD screens. A carrying case offering superior protection against shocks is disclosed in U.S. Pat. No. 5,217,119 which is marketed by PORT Computer Cases of South Norwalk, Conn., and U.S. Pat. No. 5,524,754 invented by Dale Hollingsworth use a suspension system to provide the laptop cases in which the empty space below the suspension sling, to the bottom of the case, provides twice as much protection as a equivalent amount of foam rubber padding in a fall. Most laptop users are aware that if they drop their laptop computer while holding it in a standing or seated position they may cause detriment to their computer. There are several problems that are readily apparent in the laptop case industry. 1- Most laptop users are more concerned with the bumps, jostling and shocks that their laptop computers routinely receive while walking through a busy area such as an airport terminal. 2- Current laptop cases that provide adequate protection are filled with padding, which obviously restricts the volume inside of the case. 3- Most importantly, many laptop users frequently complain about the weight of their cases, especially when peripherals such as CD's, a power supply and a mouse is also carried in the case. Fabric cases are available, however they offer very limited protection and many are not very resistant to liquid penetration.

One laptop case developed in approximately 1997, in Japan, which was not patented, was developed by Lines Ltd., of Tokyo. This case used polyurethane foam sandwiched between outside and inside fabrics. This sandwich was then heated and cold molded to form a lightweight encasement that has superior shock resistance. This case's inside lining was sewn such that the case would only open approximately 35-to-40°, thus when picked up the case would not spill its contents. This however presents an obvious problem to U.S. laptop users who frequently open and use their laptops without removing them from the case.

The present invention contemplates a new and improved carrying case, which is simple in design, effective in use, and overcomes the foregoing difficulties and others while providing better and more advantageous overall results.

SUMMARY OF THE INVENTION

In accordance with the present invention, a new and improved carrying case is provided, which includes a first side, the first side having a front and a back, a second side, the second side having a front and a back, the first and second sides connected by a hinge, two handles, a strap for securing the associated equipment, a zipper for selectively securing the case, a flexible shield, the flexible shield comprising a polyethylene layer and a fastening layer, the flexible shield increasing in width from the front of the first side to the zipper, the flexible shield increasing in width from the front of the second side to the zipper, an adapter, an adapter cord, and a cord retractor.

In accordance with another aspect of the present invention, the flexible shield includes a elastically deformable material, the material increasing in width from the associated front of the associated first side to the associated back of the associated first side, the material increasing in width from the associated front of the associated second side to the associated back of the associated second side, wherein the elastically deformable material is a polymer, preferably polyethylene, and the flexible shield is a shell lining the associated carrying case.

In accordance with yet another aspect of the present invention, the case includes a first side, the first side having a front and a back, a second side, the second side having a front and a back, attaching means for attaching the first side and the second side, a flexible shield, the flexible shield comprising a elastically deformable layer, a fastening layer, the flexible shield increasing in width from the front of the first side to the attaching means, the shield increasing in width from the front of the second side to the attaching means, the case being capable of being opened at least 90°, preferably to substantially 180°, a strap for securing the associated equipment, and protective pads fastened to the fastening layer.

In accordance with still another aspect of the present invention the case includes a first side, the first side having a front and a back, a second side, the second side having a front and a back, the first and second sides being connected together, an adapter, an adapter cord, a cord retractor, a side wall, and an adapter port, the adapter port located in the side wall, the adapter port allowing the adapter cord to pass through the carrying case without opening the case.

In accordance with another aspect of the present invention, a method for protecting electronic and other delicate equipment includes the steps of providing a carrying case, the carrying case having first and second sides, the sides each having a front and a back, lining the carrying case with a flexible shield, the shield increasing in width from the front of the first side to the back of the first side, the shield increasing in width from the front of the second side to the back of the second side, and providing a strap for securing the associated equipment.

In accordance with yet another aspect of the present invention, a method for recharging electronic equipment without removing the equipment from an associated carrying case includes the steps of providing an adapter, an adapter cord, an adapter port, and a cord retractor, pulling the cord through the adapter port, plugging the cord into a power source, recharging the associated equipment, unplugging the cord from the power source, and retracting the cord.

In accordance with another aspect of the present invention, the flexible shield includes the elastically deformable material decreasing in density from the associated front of the associated first side to the associated back of the associated first side, and the material decreasing in density from the associated front of the associated second side to the associated back of the associated second side.

Accordingly, several advantages of the present invention are as follows:

Providing a laptop case that contains its own built in adapter so that the computer batteries may be recharged without opening the carrier case;

Providing a laptop case that is extremely light in weight;

Providing a laptop case that uses polyethylene to improve computer shielding and decrease weight;

Providing a case that is much easier to manufacture and simple to use;

Providing a case that has a safety cord that when hooked with the case zipper completely open, will not spill its contents if picked up by the handle;

Providing a case that uses an encasement shell that will provide shielding and cushioning so that wasting valuable volume will not be necessary;

Providing a case that can be opened 180 degrees to allow access to the computer without removing it from the case; and, Providing an encasement structure that changes densities to enhance the dissipation of force and is easily manufactured.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

LIST OF REFERENCE NUMERALS

4 Surface Material
6 Polyethylene Layer
8 Velcro Lining
10 Flexible Shield
12 Carrying Case
14 Shoulder Strap D-rings
16 Carrying Handles
18 Front Handle Reinforcement
20 Logo Indentation
22 Front Pocket Zipper
24 Reinforcements For Zipper Stops
26 Front Pocket
28 Back Handle Reinforcement
30 Case Zipper
32 Adapter Port Cover
34 Hinge
36 Back Reinforcement Depression
38 Safety Strap
40 Safety Hook D-ring
42 Safety Hook Clasp
44 Portfolio
46 Portfolio Hook Clasps
48 Portfolio Anchor D-rings
50 Cord Retractor
52 Laptop Computer
54 Adapter
56 Adapter Cord
58 Adapter Cord Spindle
60 Cord Retractor Clip
64 Velcro Pad
66 Rectangular Velcro Pad
68 First Side
70 Second Side
72 Plug
74 Plug Cord
76 Cord Port

DESCRIPTION OF THE PREFERRED EMBODIMENT

Figure 1:
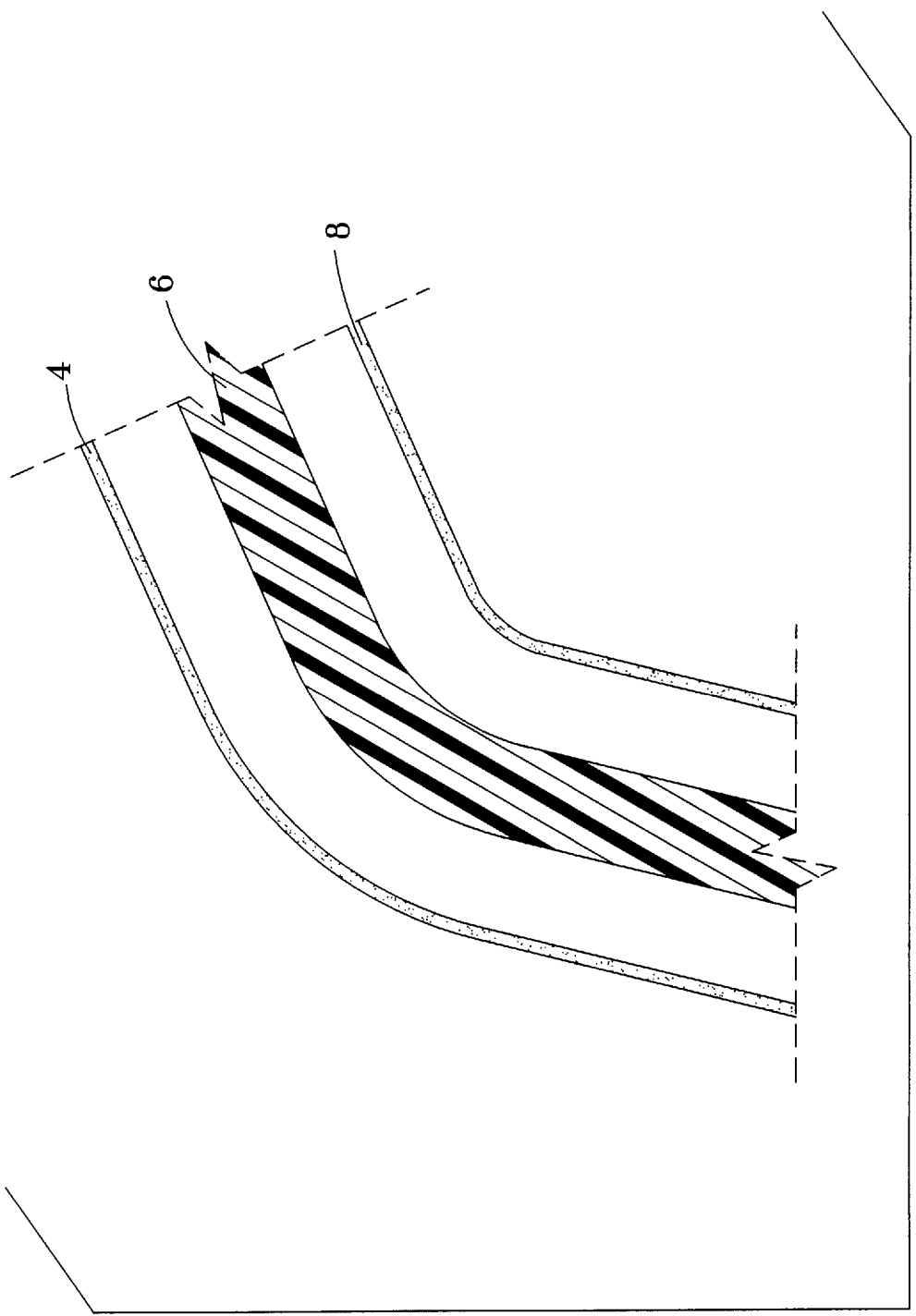
FIG. 1 is a cross-sectional view of the flexible shield, before molding, showing the cover material, polyethylene center and Velcro® inside lining.

Referring now to the drawings, which are for purposes of illustrating a preferred embodiment of the invention only, and not for purposes of limiting the invention, FIG. 1 shows the three layers (surface material 4, polyethylene layer 6, and fastening layer 8) of a flexible shield 10 before the shield 10 has been treated. Before treatment, the polyethylene layer 6 is of a uniform width throughout as shown in FIG. 1. In the preferred embodiment the polyethylene 6 has a uniform width of 10 millimeters. It is to be understood that the use of polyethylene is only a preferred embodiment, and is not intended to limit the invention in any way. The flexible shield 10 can be made of any elastically deformable material. By "elastically deformable" it is meant the material returns substantially to its original shape after being compressed. Polyethylene is preferred because it improves shielding of the delicate equipment and decreases the weight of the case 12.

Figure 2:
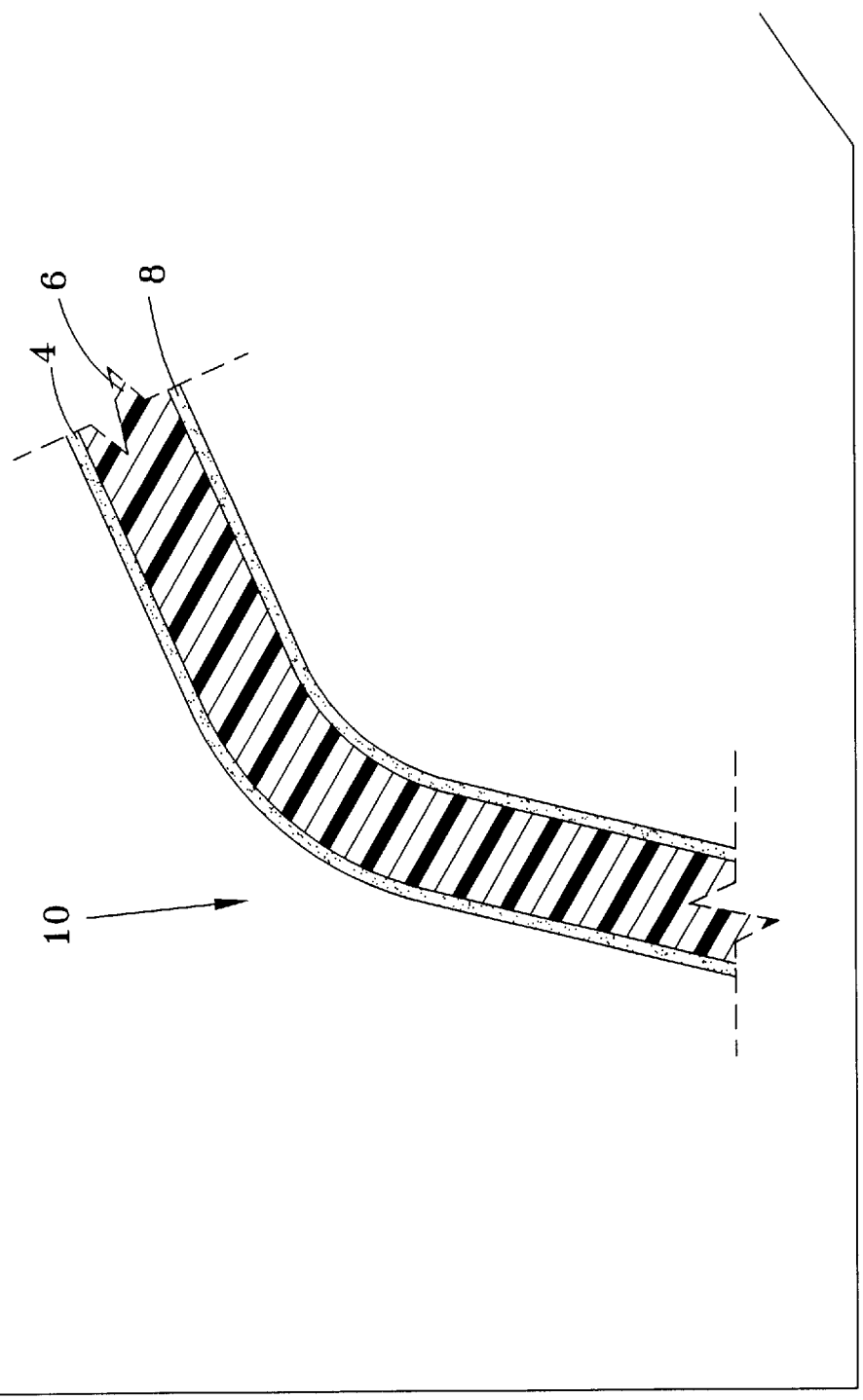
FIG. 2 is a cross-sectional view showing the "sandwich" after the layers of material have been laminated together and heat molded to different widths.
Figure 3:
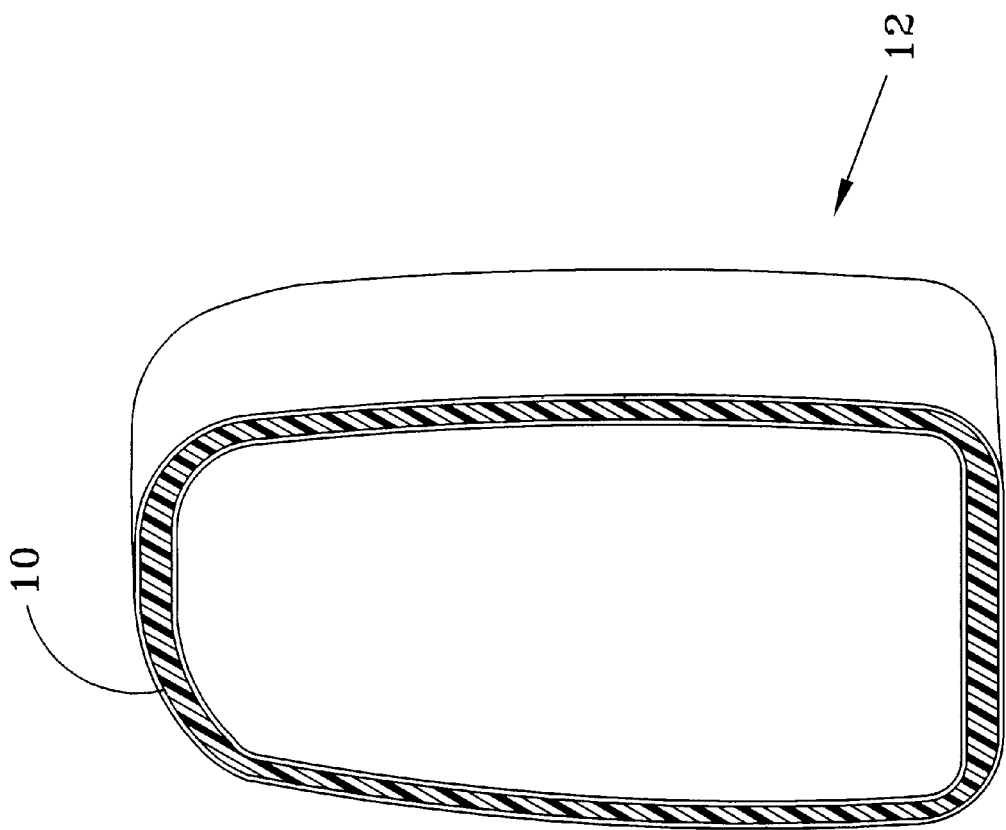
FIG. 3 is a cut away view of the case showing the different widths around the case.
Figure 4:
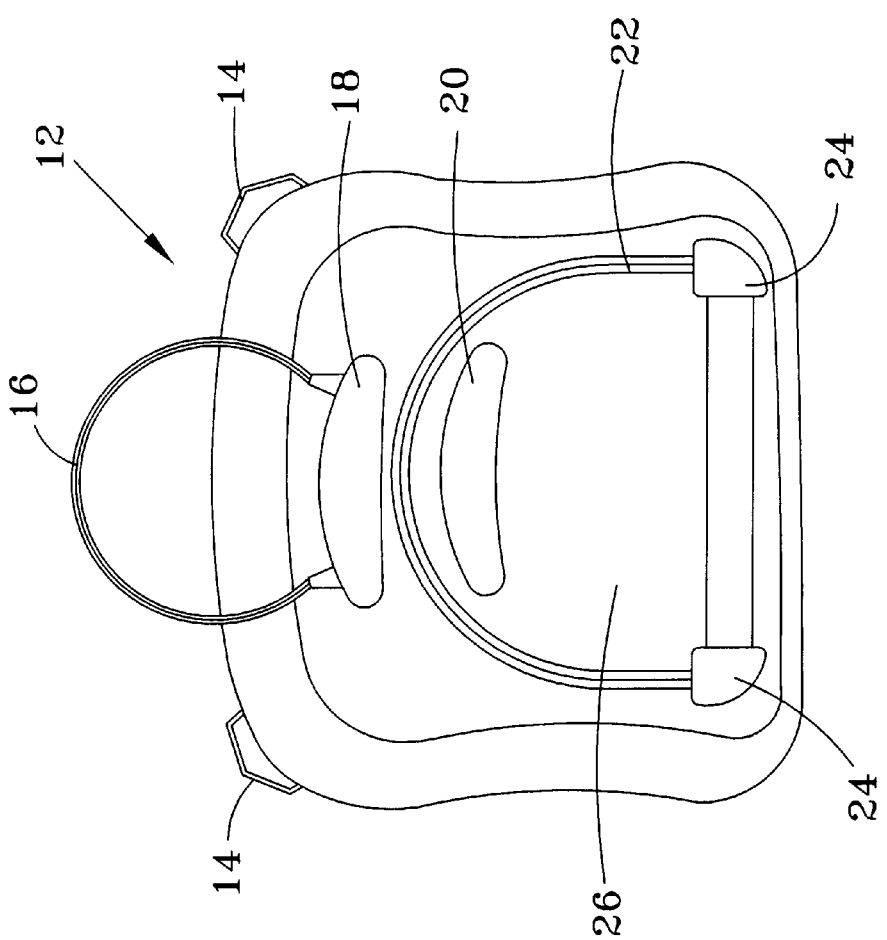
FIG. 4 is a front plan view of the case.
Figure 5:
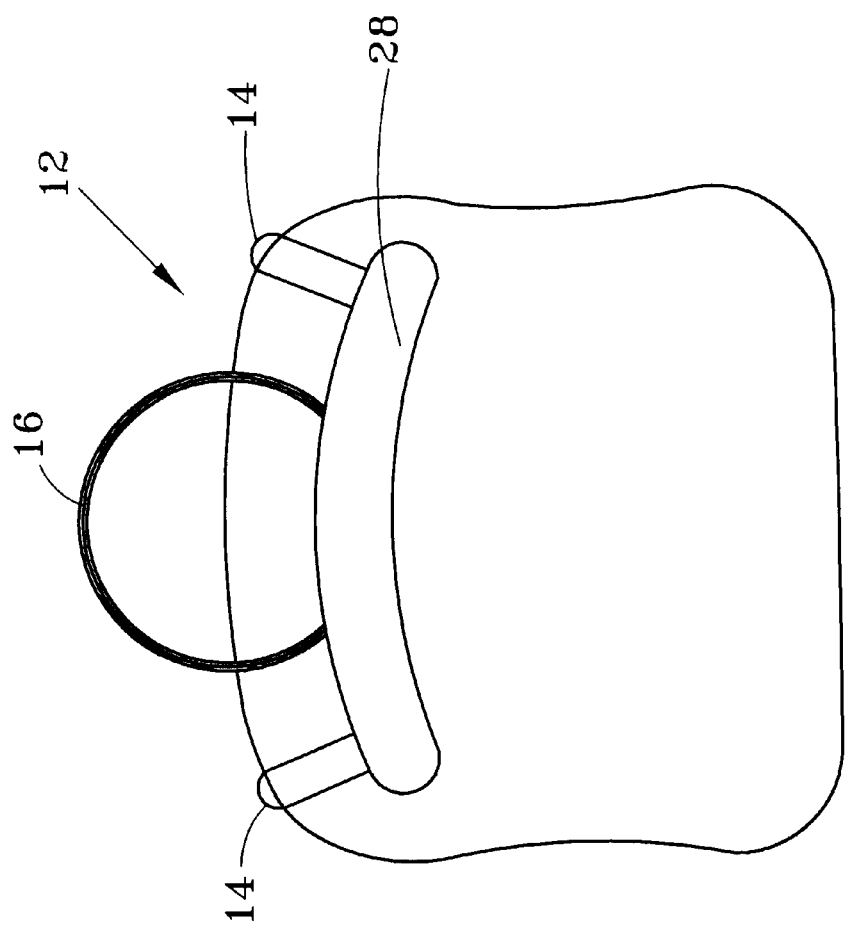
FIG. 5 is a back plan view of the case.
Figure 6:
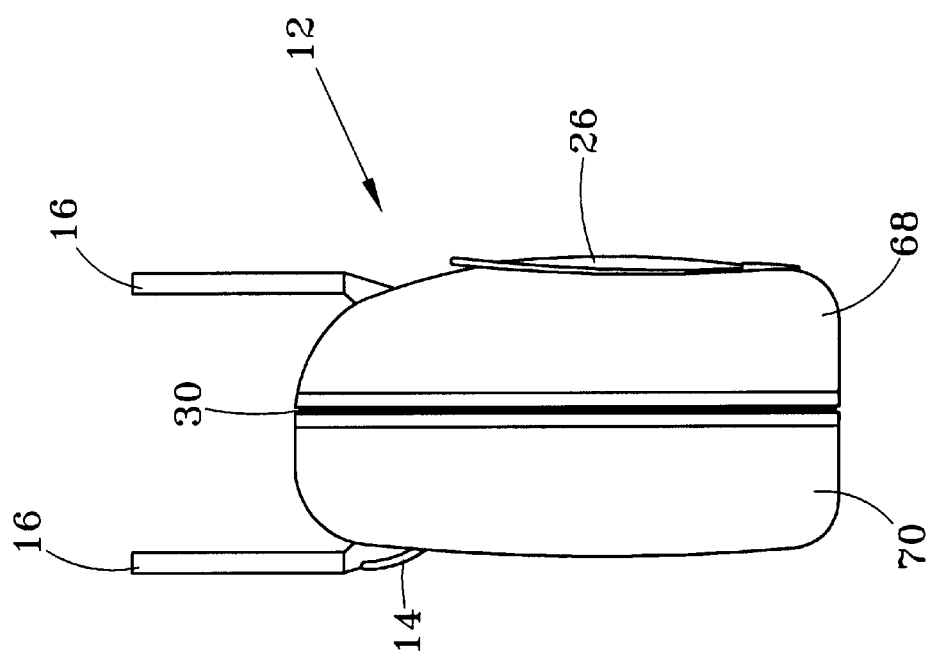
FIG. 6 is a right side perspective view of the case.
Figure 7:
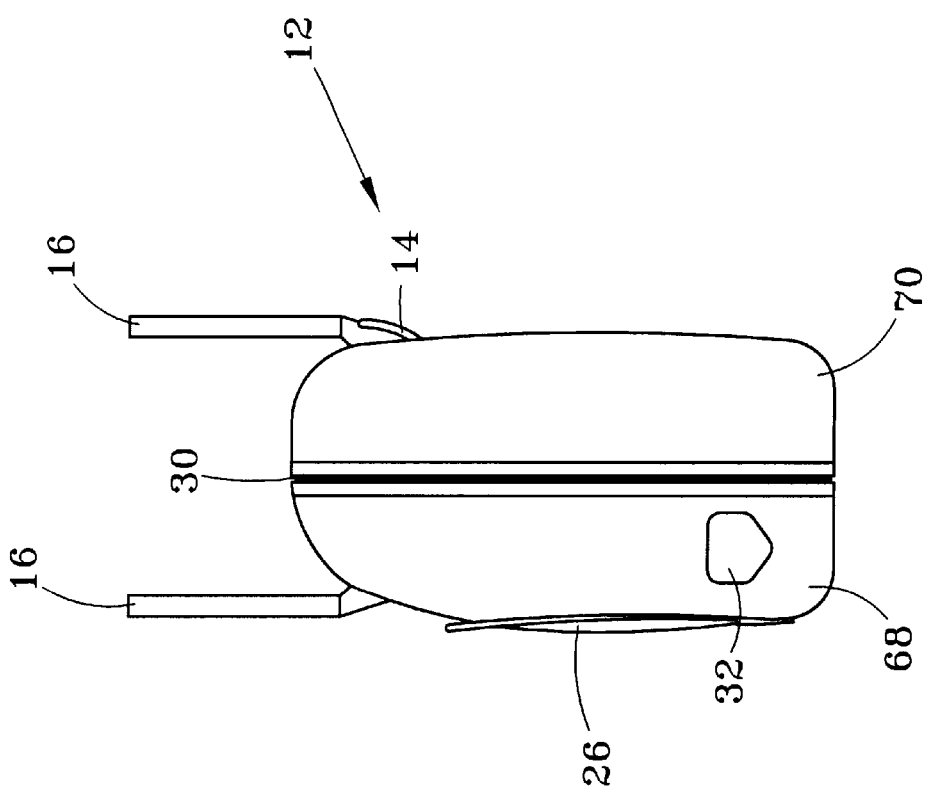
FIG. 7 is a left side perspective view of the case, showing the adapter port with port cover.
Figure 8:
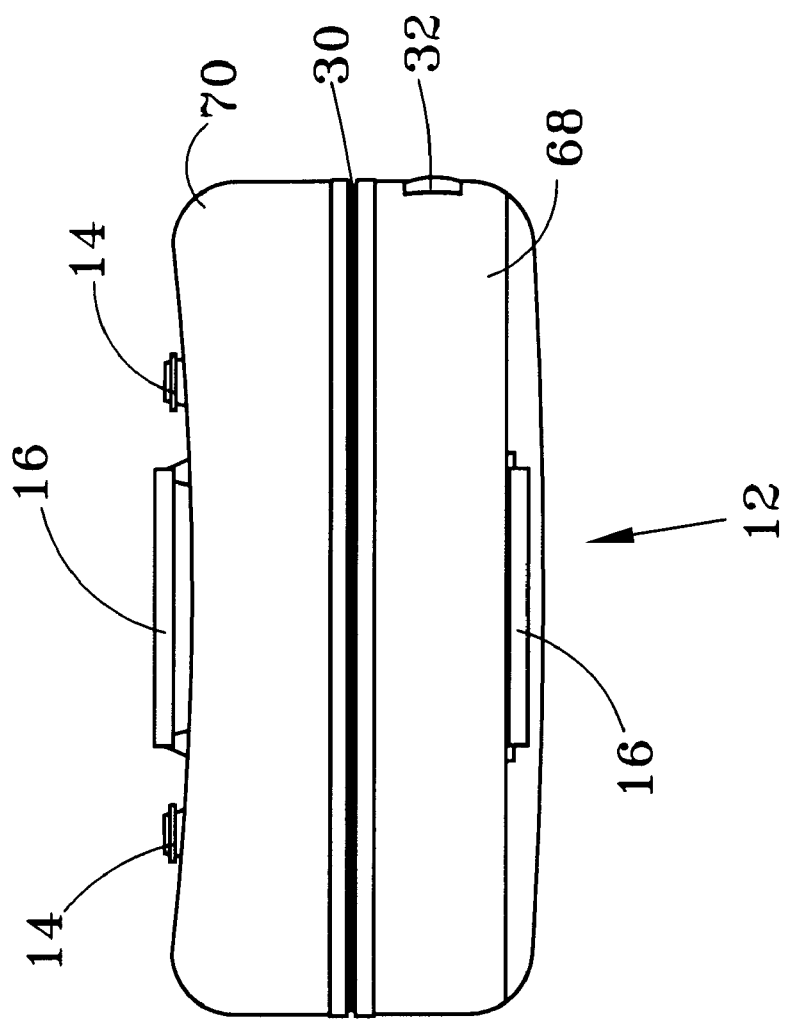
FIG. 8 is a top plan view of the case.
Figure 9:
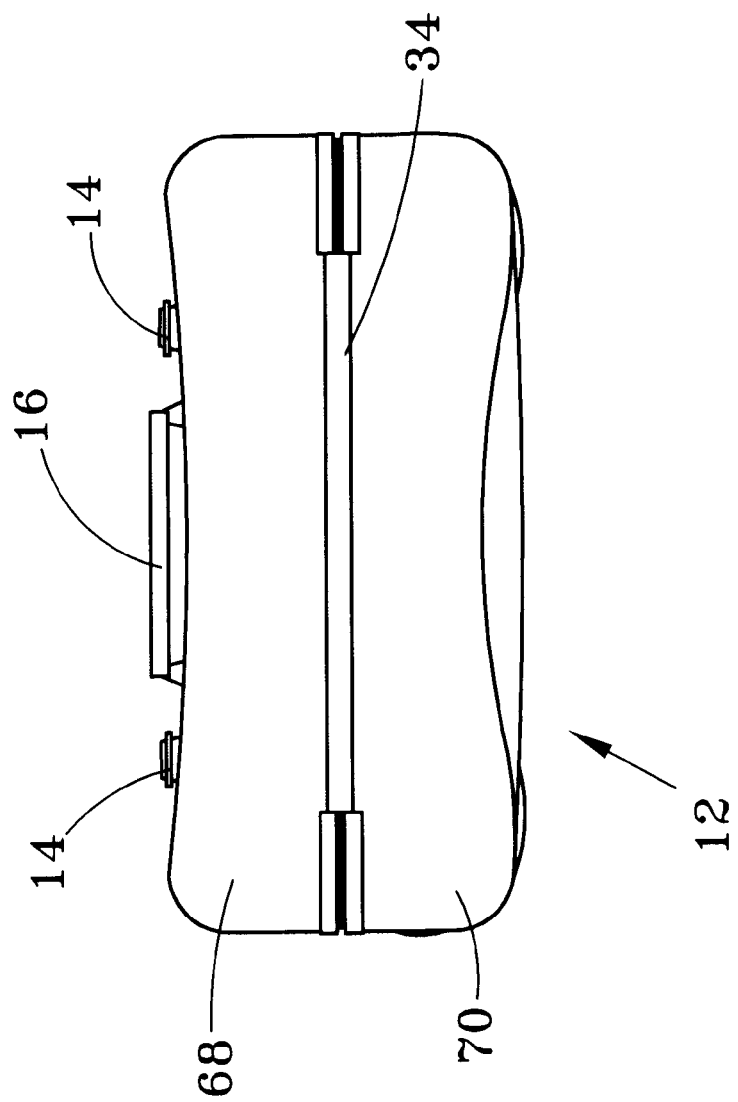
FIG. 9 is a bottom plan view of the case.
Figure 14:
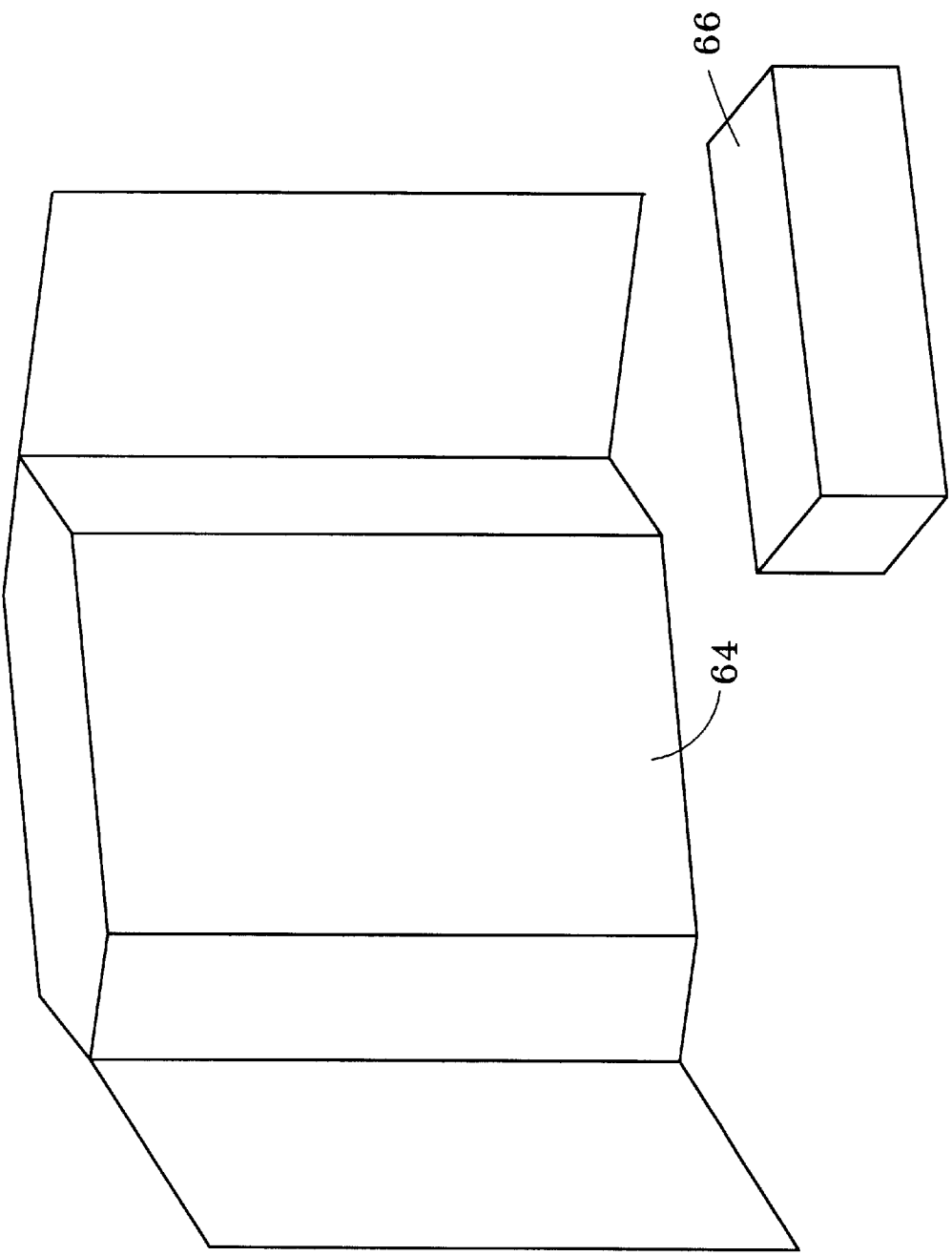
FIG. 14 is a perspective view of the protective pads.
Figure 15:
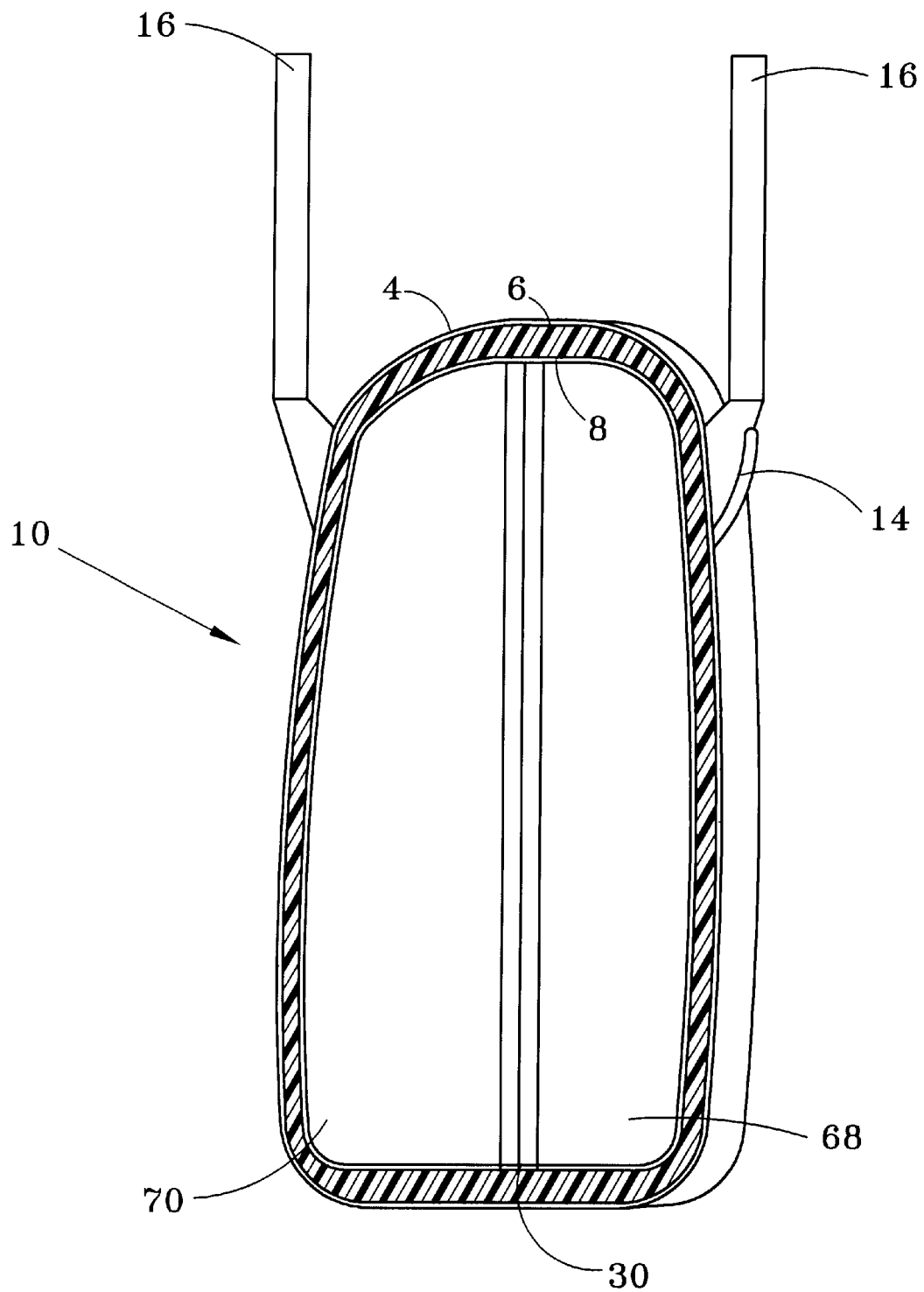
FIG. 15 is a cross-sectional view of the case, showing the change in width of the shield from the front to the back.

With reference now to FIG. 2, manufacturing a carrying case 12 begins with the materials that comprise a first side 68 and second side 70 of the case 12. FIG. 2 depicts lightweight polyethylene 6, which is laminated between the surface material 4, chosen for the outside appearance, and the Velcro® inside lining 8. The polyethylene used may be of varying thickness and densities determined by the ultimate hardness that is desired and the type of case 12 being manufactured. The surface material 4 can be any number of materials including ballistic nylon, leather, or swimsuit material. Consequently, colors may be changed easily. The flexible shield 10, which is comprised of cover material 4, polyethylene 6, and Velcro® 8, in that order, is then heat molded and water cooled to a varying thickness as depicted in FIG. 15. The Velcro® lining 8 is used as a fastening layer for attaching protective foam pads 64, 66 as shown in FIG. 14. The fastening layer 8 can be any material chosen using sound engineering judgment.

In the preferred embodiment, the mold for the case 12 is constructed so that the front and back (shown, but not referenced) of the first and second sides 68, 70 have a thickness of 5 millimeters, the thickness being increased through the radius of the curve that forms the case 12, to a thickness of 8 millimeters at a case zipper 30, leaving a thin edge for sewing piping and zippers. In the preferred embodiment, the area of the shield 10 that is 5 millimeters thick is a high density polyethylene and the 8 millimeter thick area is a low density polyethylene. The different densities of polyethylene allow the force to be more effectively dissipated away from the equipment. When the shield 10 is formed into the sides 68, 70 of the case 12 and a cross section of the case 12 is viewed, as shown in FIG. 15, the width of the shield 10 increases from the front of the first side 68 to the case zipper 30 and increases in width from the front of the second side 70 to the case zipper 30. This variance in width allows the shock of an impact to be deflected to the sides of the case 12, thereby preventing most of the force from impacting the equipment in the case 12.

With reference now to FIGS. 6, 11, 12, and 13, once the sides 68, 70 are molded, any excess is trimmed and then a cord retractor sheath 62, safety hook D-rings 48, front pocket zipper 22, case zipper 30 and piping (not shown) are attached to the case 12. Handles 16 and their reinforcements 18, 28, shoulder strap D-rings 14, and the adapter port cover 32 are also attached. The safety hook D-ring 48 for a safety hook clasp 40 and a safety strap 38 also are attached to the case 12. The safety hook D-rings 48 are attached to the case 12 and the hook clasps 40 hook into the D-rings 48. If a logo (not shown) is desired it may be stamped onto faux leather and sewn into an indentation 20.

Figure 10:
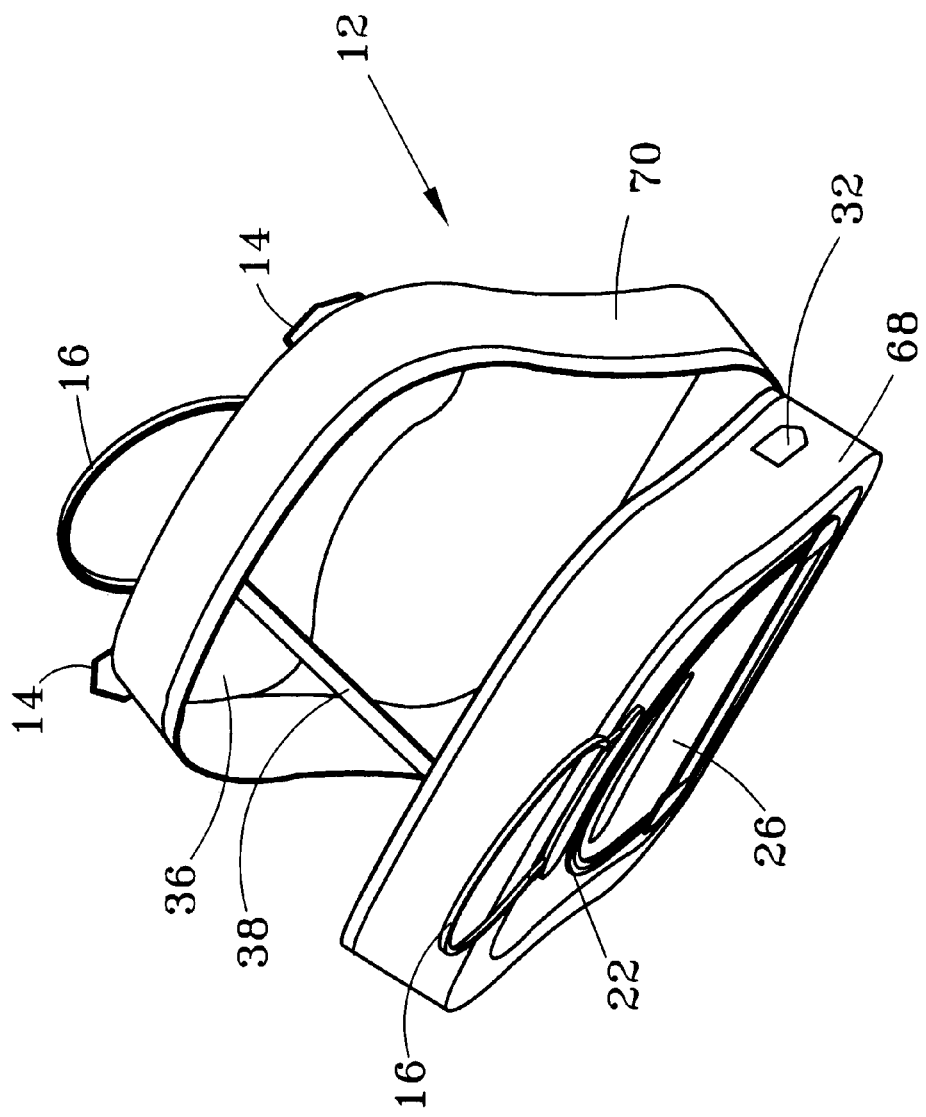
FIG. 10 is a perspective view of the case open at approximately 40° with the safety strap employed.
Figure 11:
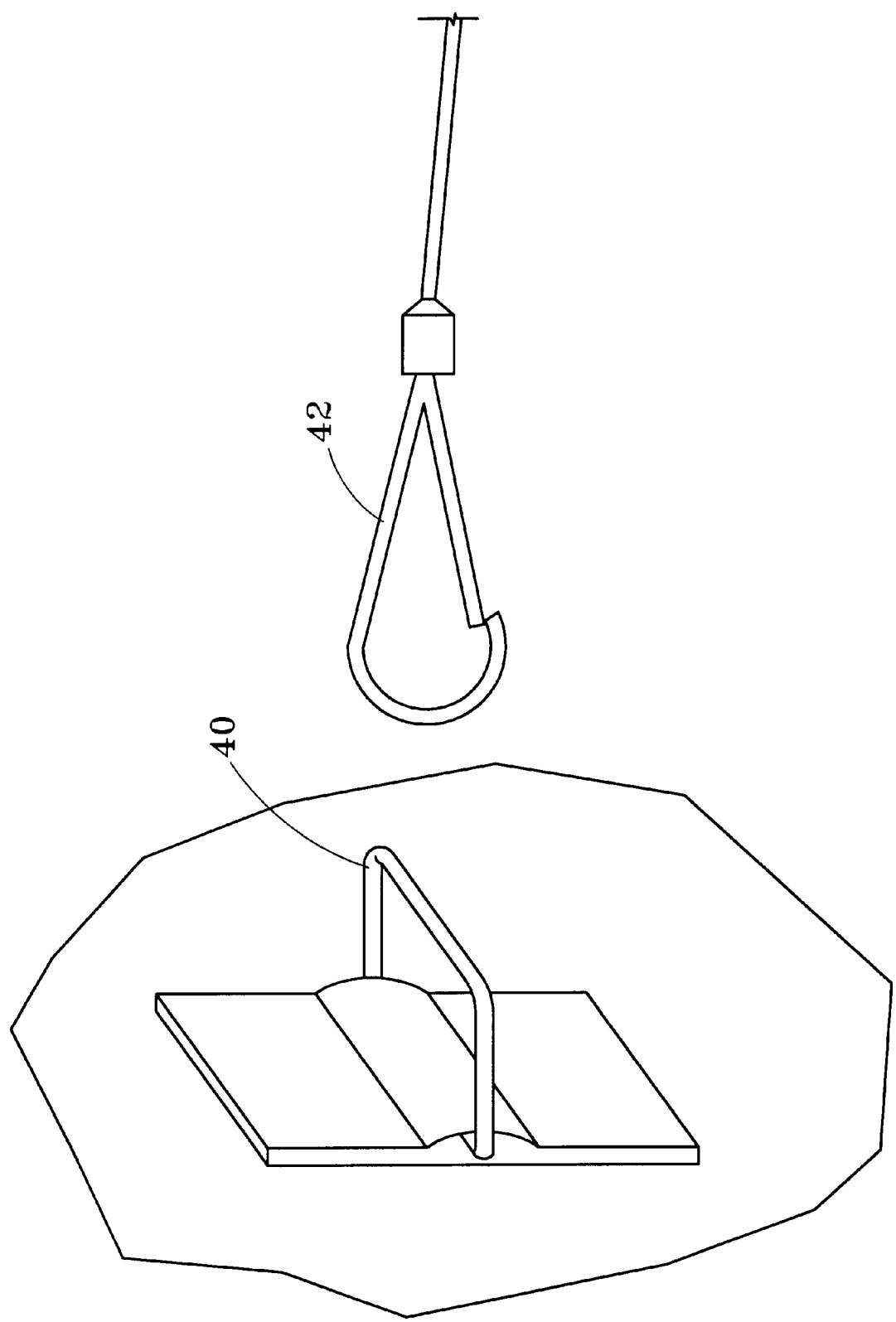
FIG. 11 is an exploded view of the D-ring and hook/clasp safety cord system.

The safety strap 38, as shown in FIG. 10, which is to prevent the electronic equipment from falling out of the case 12, attaches to the clasps 40. The safety strap 38 allows for extra protection of the equipment if the equipment becomes loose in the case 12. The operation of the safety strap 38 is very simple. The safety hook clasp 42 is simply hooked to the safety hook D-Ring 40. The safety strap 38 is approximately 12 inches long and therefore, when hooked, will allow the case 12 to only open approximately 40°. At this angle the case 12, when held by a carrying handle 16, will be kept upright, restricting the spillage of computer 52 or its peripherals.

Lastly, a nylon hinge 34 is attached to the case 12, connecting the first and second sides 68, 70 of the case 12. The hinge 34 allows the case to be opened such that the first and second sides 68, 70 are at a 180° angle with respect to each other. A cord retractor 50 is attached to the case 12 by a cord retractor clip 60, by slipping the clip 60 into the cord retractor 50. The cord retractor 50 and adapter 54 will be discussed in more detail later.

Figure 12:
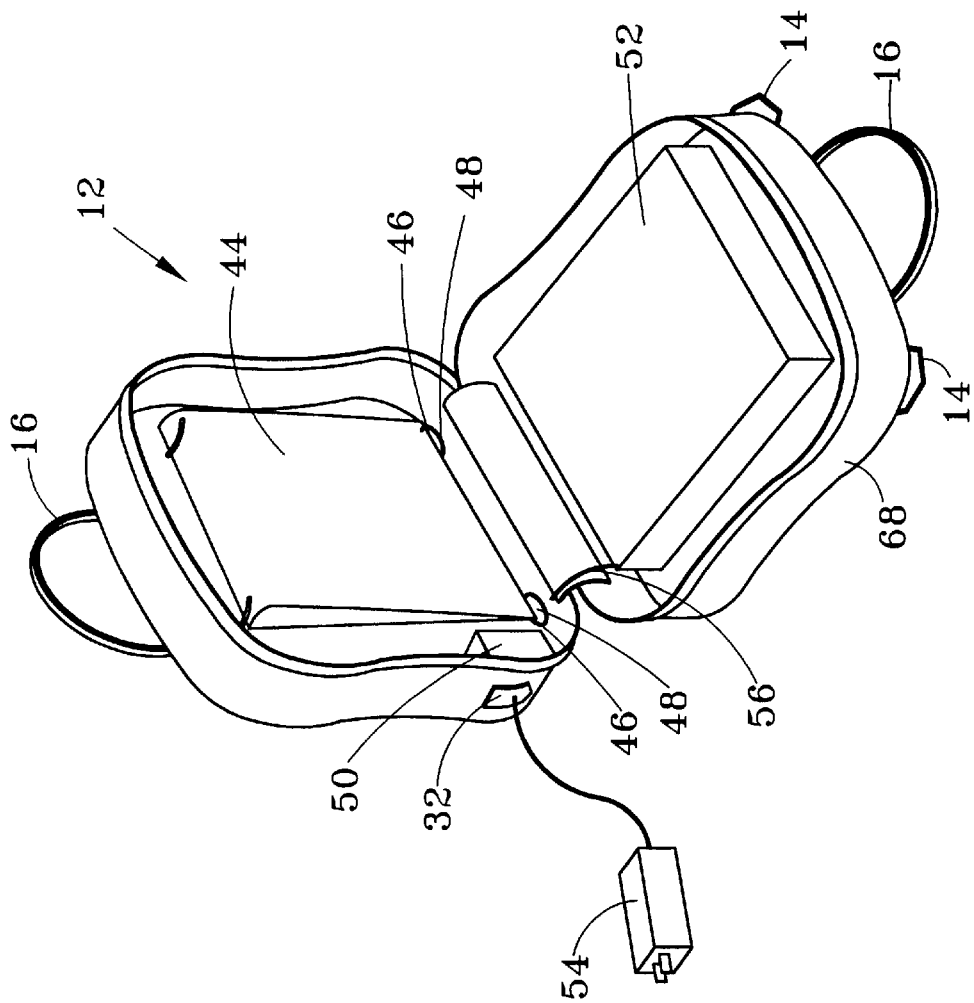
FIG. 12 is a perspective view of the case open with a laptop computer inside, showing a basic cord retractor and the adapter.

With reference now to FIG. 12, in the preferred embodiment, a portfolio 44 for holding loose papers, folders, etc. is constructed separately and the portfolio hook clasps 46 are affixed so that the portfolio 44 may be attached to the portfolio anchor D-rings 48 that have been attached to the case 12. The portfolio 44 is located in the inside of the second side 70 of the case 12, opposite the laptop computer 52. The 180° opening of the case 12 allows easy simultaneous access to both the portfolio 44 and the computer 52.

Figure 13:
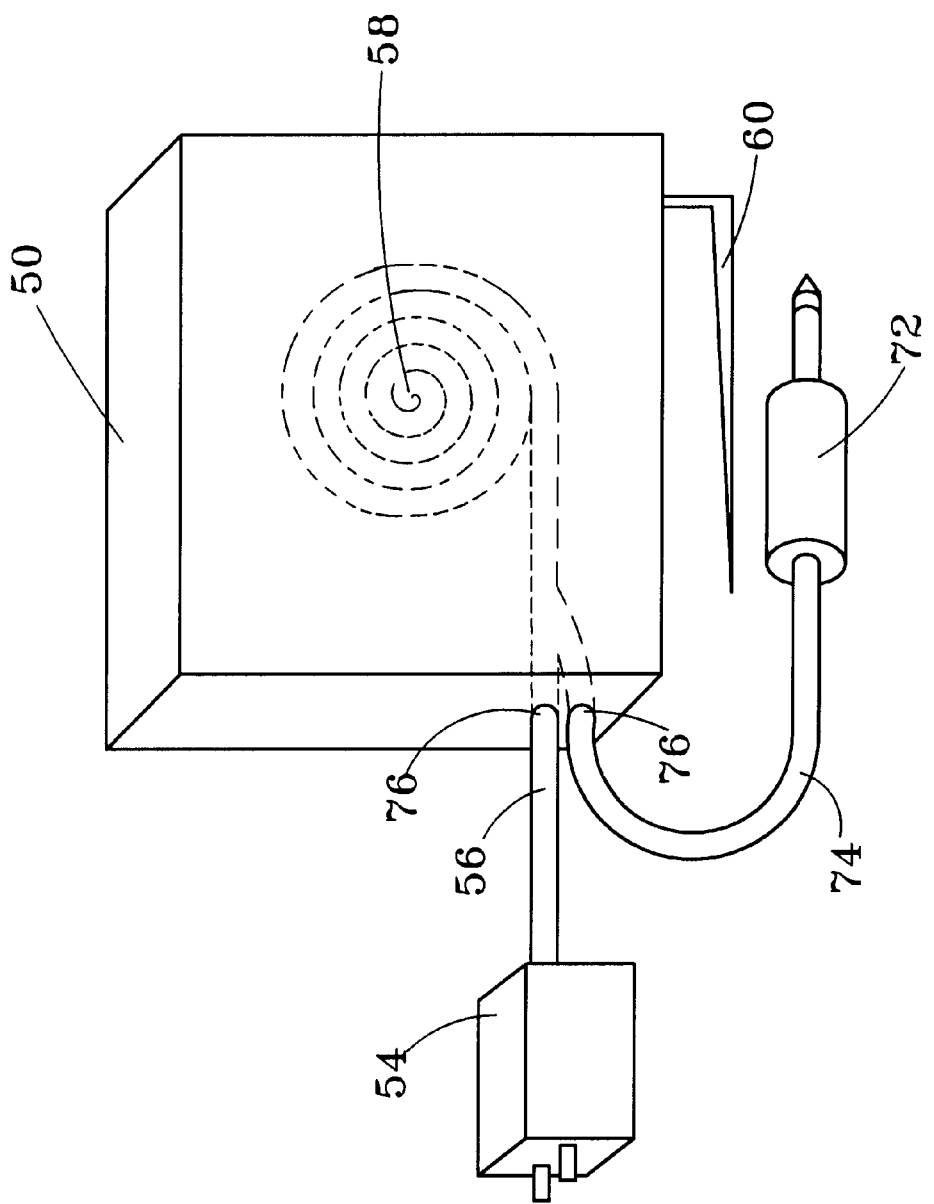
FIG. 13 is a cutaway view of a basic cord retractor.

With reference now to FIGS. 12 and 13, the most preferred embodiment of the present invention includes the cord retractor 50 that allows the laptop computer 52 to be recharged without opening the case 12. The cord retractor 50 is attached to the case 12 by the cord retractor clip 60. The cord retractor 50 can be attached to the case 12 in any manner chosen using sound engineering judgment. The operation of the cord retractor 50 is well known in the art and, for the sake of brevity, will not be discussed herein. Contained with the cord retractor 50 is a cord spindle 58, around which an adapter cord 56 and a plug cord 74 are wrapped. The adapter cord 56 and plug cord 74 can either be two separate cords from the beginning or the cords 56, 74 can be spliced at cord ports 76. A plug 72 is located at the end of the plug cord 74. The plug 72 plugs into the computer 52 so that the power source (not shown) is connected to the computer 52. An adapter 54 is located at the end of the adapter cord 56. The adapter 54 is plugged into the power source. The adapter 54 is detachable from the adapter cord 56, so that when the computer 52 has been recharged, the adapter 54 is removed from the adapter cord 56 and the adapter cord 56 is retracted into the cord retractor 50. The plug 72 is also removed from the computer 52 and retracted into the cord retractor 50. If the computer 52 is already connected the to the plug 72, then the computer battery (not shown) may be recharged without opening the case 12.

Theory of Operation

The operation of the flexible shield 10 is easily illustrated by considering the operation of a convex dome when force is applied. If one was to place a convex dome pointing up on the floor with the rim of the dome on the floor and apply G force to the outside of the dome, the force is obviously transferred across 360° to the large surface area of the rim that is resting on the floor. Compared to a flat rectangular surface, similar to the construction of most laptop cases, the rectangular surface allows the force to penetrate the structure because the force is not being transferred efficiently throughout the structure. This is why the flexible shield 10 of the present invention is spherical in shape. To help dissipate and deplete the force further, the flexible shield 10 uses different densities of polyethylene. To understand this concept compare a flexible shield laptop case to the convex dome example above.

EXAMPLE 1

Flexible Shield Laptop Case: (the dotted line inside circle is the case zipper)

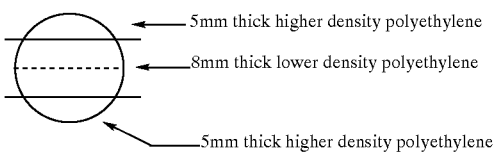

When the outside of the flexible shield laptop case 12 is bumped and G force is generated, the force is quickly dispersed across 360° and into a lower density polyethylene where the lower density polyethylene acts as a cushion and absorbs the energy, minimizing jostling and shock to the laptop computer 52. Please note, as with the circle depicted above the inventive case 12 also has a relatively large area of lower density polyethylene cushion on both sides of the case zipper 30. The area most likely to be bumped is the high density front of the case 12. The total effect of the flexible shield 10 is to deflect blows that strike the high density face area into the low density polyethylene where the force will be dissipated minimizing force transfer to the laptop computer 52.

EXAMPLE 2

Another illustration to clarify this concept would be to imagine having a normal soccer ball and a flexible shield soccer ball with its middle made up of polyethylene in the proportions shown in Example 1. Someone kicks both balls from a starting line, kicking each with the same force. The normal soccer ball would bounce and soar for a long distance. The flexible shield ball's bounce would be severely hampered by the dissipation of force caused by the cushioning of the low density area of the ball. Needless to say, the flexible shield ball would not travel as far. Hard laptop cases bounce similar to the soccer ball. Fabric laptop cases transfer the force of the blow directly to the delicate electronic devices inside, minus the cushioning effect of the foam. The present invention strives to minimize jostling by deflecting the blow through its convex shape, channeling and dissipating the energy in the lower density cushioning section of the shield 10.

Operation of the Invention

The operation of the flexible shield 10 is very simple; force that impacts the case 12 is transferred throughout the encasement, thereby dissipating the energy of the blow. This minimizes the negative effect of the blow to the laptop computer 52 or device encased.

Conclusion, Ramifications, and Scope of Invention

Thus the reader will see that the carrying case of the present invention provides a very functional, light weight, high volume case that provides superior protection for the delicate devices contained therein. While the above description contains many specifics, these should not be construed as limitations on the scope of the invention, but rather as an exemplification of one preferred embodiment thereof. Many other variations are possible. For example, thicker width polyethylene could be used to make a sturdier case. The cover material could be changed from swimsuit material to leather. Additionally, as smaller adapters meet the requirements for laptop cases and they are sold with the laptop computers, an adapter need not be installed at all, but simply have the case manufactured with an adapter port and easily used cord retractor.

The invention is not limited to cases for laptop computers and electronic equipment. The invention encompasses any case to carry an item that needs to be protected from impact. A non-exhaustive list includes, musical instruments, pottery, porcelain dolls, computers, breakable foodstuffs, glass, and other potentially breakable items.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

We claim:

1. A carrying case for protecting associated electronic and other delicate equipment, the carrying case comprising:
   a first side, the first side having a front and a back;
   a second side, the second side having a front and a back, the first and second sides connected by a hinge;
   two handles;
   a strap for securing the associated equipment;
   a zipper for selectively securing the case;
   a flexible shield, the flexible shield comprising a polyethylene layer and a fastening layer, the flexible shield increasing in width from the front of the first side to the zipper, the flexible shield increasing in width from the front of the second side to the zipper, the polyethylene decreasing in density from the front of the first side to the zipper, the polyethylene decreasing in density from the front of the second side to the zipper;
   an adapter;
   an adapter cord; and,
   a cord retractor.

2. A flexible shield for use in an associated carrying case, the case having an associated first side, having an associated front and back, an associated second side having an associated front and back, the flexible shield comprising:
   an elastically deformable material; and,
   the material increasing in density from the associated front of the associated first side to the associated back of the associated first side, and the material decreases in density from the associated front of the associated second side to the associated back of the associated second side.

3. The flexible shield of claim 2, wherein the material increases in width from the associated front of the associated second side to the associated back of the associated second side.

4. The shield of claim 2, wherein the elastically deformable material is a polymer.

5. The shield of claim 4, wherein the polymer is polyethylene.

6. The shield of claim 2, wherein the flexible shield is a shell lining the associated carrying case.

7. The flexible shield of claim 2, wherein the shield further comprises:
   an adapter;
   an adapter cord; and,
   a cord retractor.

8. The case of claim 7, wherein the case further comprises:
   a side wall;
   an adapter port, the adapter port located in the side wall, the adapter port allowing the adapter cord to pass through the carrying case without opening the case.

9. The case of claim 7, wherein the case has a flexible shield for protecting the associated electronic equipment.

10. The case of claim 8, wherein the flexible shield has a polyethylene layer and a fastening layer, the polyethylene layer increasing in width from the front of the first side to the back of the first side, the polyethylene layer increasing in width from the front of the second side to the back of the second side.

11. The case of claim 9, wherein the flexible shield is a shell lining the interior of the case.

12. A carrying case for protecting associated electronic and other delicate equipment, the carrying case comprising:
- a first side, the first side having a front and a back;
- a second side, the second side having a front and a back; attaching means for attaching the first side and the second side;
- a flexible shield, the flexible shield comprising:
- an elastically deformable layer;
- a fastening layer; and, the flexible shield increasing in density from the front of the first side to the attaching means.

13. The case of claim 12, wherein the layer increases in density from the front of the second side to the attaching means.

14. The case of claim 12, wherein the case can be opened at least 90°.

15. The case of claim 14, wherein the case can be opened to substantially 180°.

16. The case of claim 12, wherein the case further comprises a strap for securing the associated equipment.

17. The case of claim 16, wherein protective pads are fastened to the fastening layer.

18. A method for protecting associated electronic and other delicate equipment, the method comprising the steps of:
- providing a carrying case, the carrying case having first and second sides, the sides each having a front and a back; and,
- lining the carrying case with a flexible shield, the shield increasing in density from the front of the first side to the back of the first side.

19. The method of claim 18, wherein lining the carrying case with a flexible shield, the shield increasing in width from the front of the first side to the back of the first side further comprises step of:
- the shield increasing in width from the front of the second side to the back of the second side.

20. The method of claim 19, wherein providing a carrying case, the carrying case having first and second sides, the sides each having a front and a back, further comprises the step of:
- providing a strap for securing the associated equipment.

* * * * *